E. P. SEARING.
WARPING MACHINE.
APPLICATION FILED AUG. 13, 1912.
1,133,749.
Patented Mar. 30, 1915.
2 SHEETS—SHEET 2.
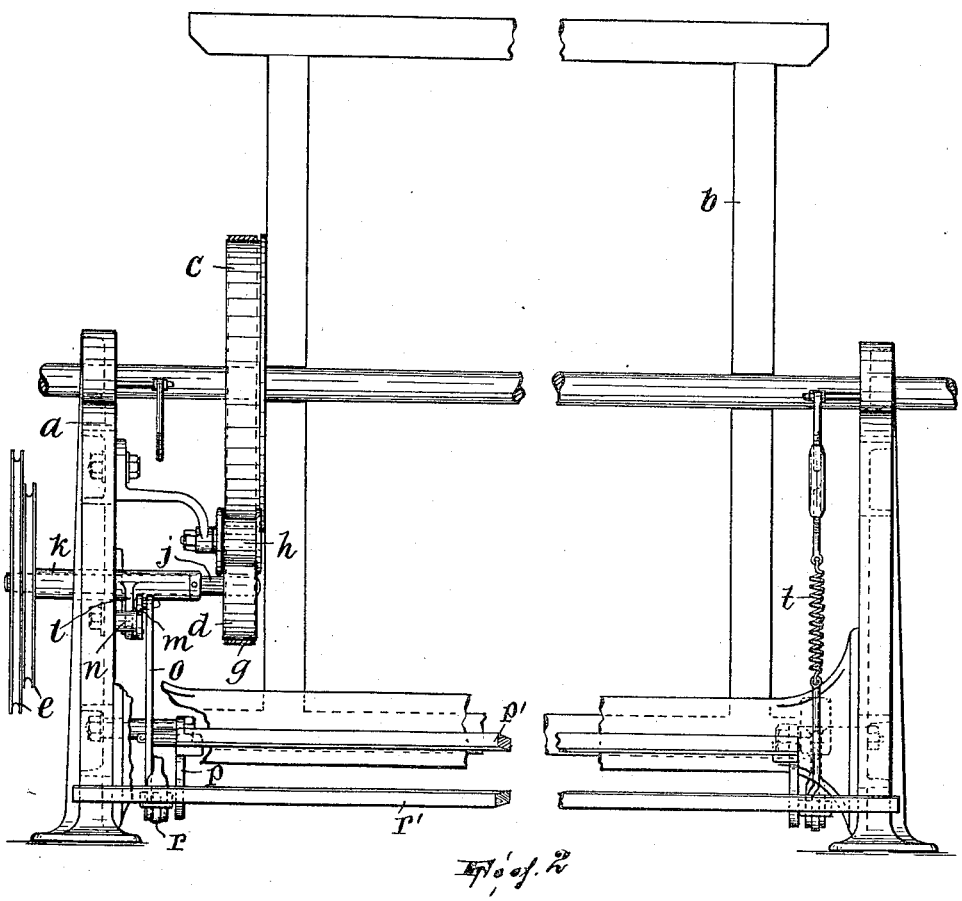
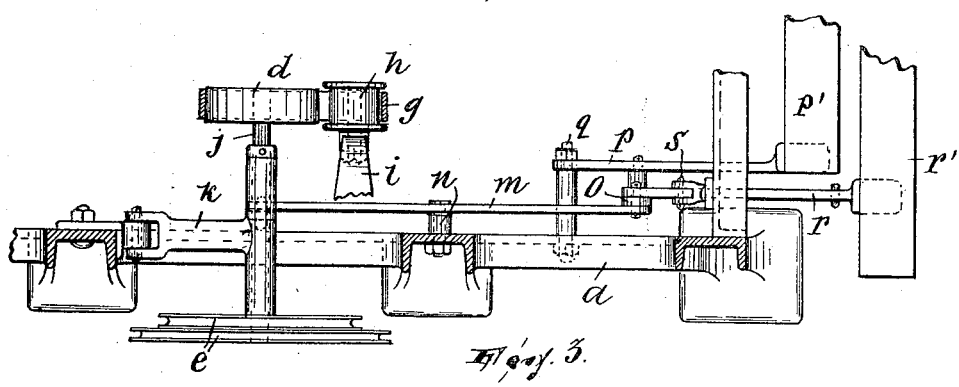
WITNESSES
INVENTOR,
Eugene P. Searing,
BY
ATTORNEY.

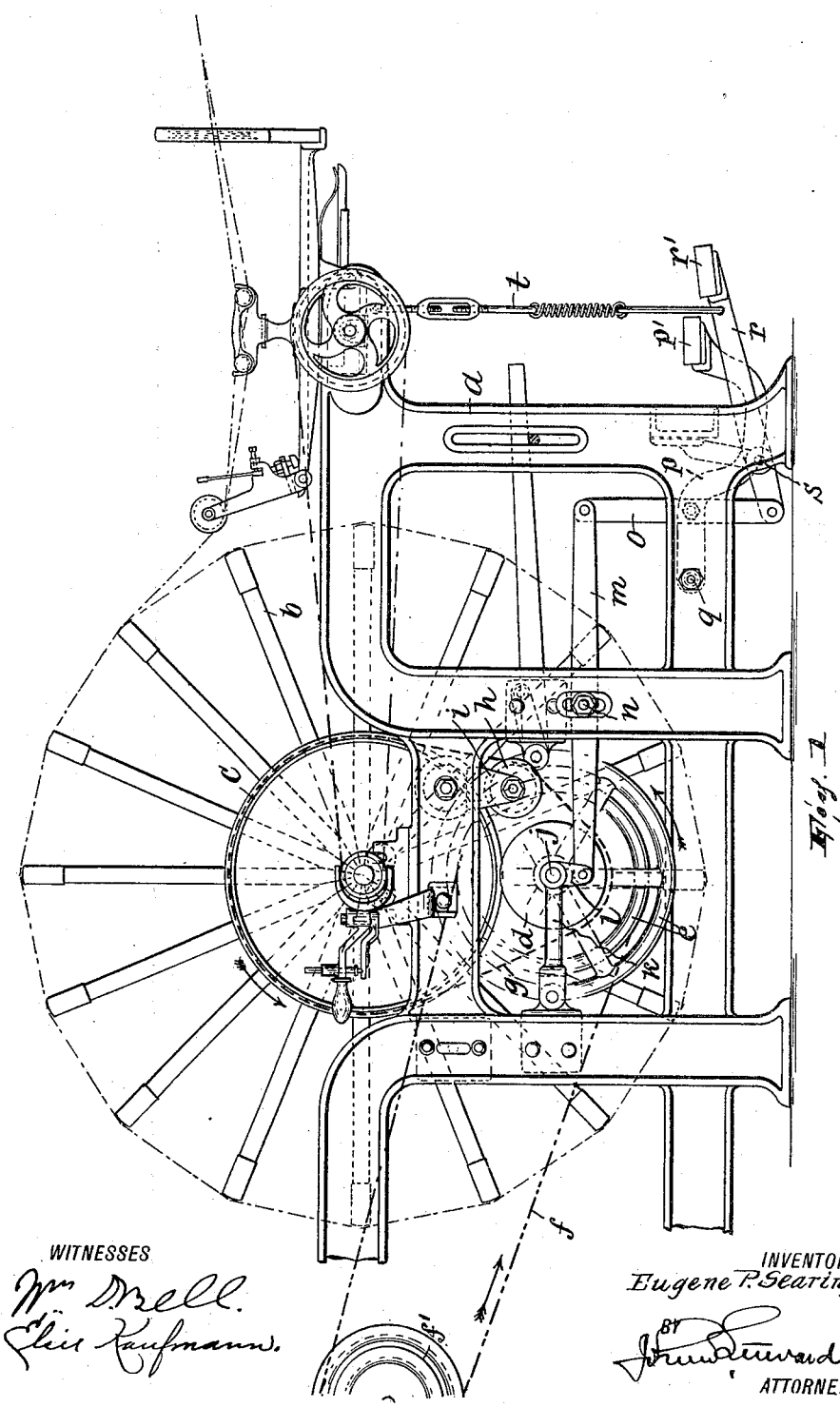

UNITED STATES PATENT OFFICE.

EUGENE P. SEARING, OF PATERSON, NEW JERSEY, ASSIGNOR TO BENJAMIN EASTWOOD COMPANY, OF PATERSON, NEW JERSEY, A CORPORATION OF NEW JERSEY.

WARPING-MACHINE.

1,133,749.  Specification of Letters Patent.  Patented Mar. 30, 1915.

Application filed August 13, 1912. Serial No. 714,841.

*To all whom it may concern:*

Be it known that I, EUGENE P. SEARING, citizen of the United States, residing at Paterson, in the county of Passaic and State of New Jersey, have invented certain new and useful Improvements in Warping-Machines, of which the following is a specification.

This invention relates to warping machines and particularly to the means for driving the reel on which in such a machine the warps are laid. As heretofore constructed this means included a friction-wheel or band on the reel and a suitably driven friction-wheel which was shifted into contact with the first wheel to drive the same (and hence the reel) and out of contact therewith when the rotation of the reel was to stop. Backward rotation of the wheel, the necessity for which frequently arises in the warping operation, was required to be performed by hand by a pull exerted by the attendant on the warps after the reel had been brought to a stop—an operation which was both tedious and time-wasting and which involved more or less strain on the warps and occasionally the breaking thereof. In accordance with the present invention the means for driving the reel is so constructed that the attendant can cause it to rotate the reel in either direction, as well as stand idle or neutral with respect thereto so that the reel will remain stationary, and this, moreover, in a way involving his perfect control of the reel as the winding or unwinding proceeds. Further, by the present invention the character of the drive is such that the power is transmitted to the reel under a condition more positive than heretofore when the reel is being rotated forward and hence against the resistance exerted by the warp.

The invention will be found fully illustrated in the accompanying drawings, wherein, Figure 1 is a side elevation of a warping machine constructed in accordance with the present invention; Fig. 2 is a front elevation thereof, partly in section; and, Fig. 3 is a horizontal sectional view in a plane just above the wheel $d$.

In the frame $a$ is journaled in the usual manner the reel $b$ to which is attached the usual driven wheel $c$. Adapted to peripherally engage the wheel $c$ is the driving wheel $d$ which, according to the usual construction, forms substantially one member with the pulleys $e$ around either of which extends the driving belt $f$ itself driven by the suitably rotated pulley $f'$ around which it also extends. In the usual construction wheel $d$ is shifted into peripheral contact with wheel $c$ while rotating so as to drive the reel in the direction for winding the warps thereon and out of such contact when the reel is to be brought to a stop. In the present construction, however, I provide an endless belt $g$ which extends loosely around both of the wheels $c$ and $d$ and through it drive the reel forward (in the direction for winding the warps thereon) by shifting wheel $d$ into driving contact therewith, driving the reel backward (in the direction for unwinding the warps) by shifting said wheel $d$ into driving contact with wheel $c$, and bringing the reel to a stop by moving or shifting the wheel $d$ to a neutral position relatively to wheel $c$ and the belt. It will be obvious that by this arrangement I obtain a far better tractive effect of wheel $d$ to drive the reel forward (the condition under which it opposes greatest resistance) than formerly, due to the extended contact which it now has with the element driven thereby (belt $g$), besides providing for also driving the reel backward from wheel $d$. The peripheral surfaces of wheels $c$ and $d$ being preferably flat so as to insure a good grip of the one on the other it is preferable to guide the belt $g$ by means of a grooved idler pulley $h$ around which the belt also extends, the same being journaled in a bracket $i$.

I preferably provide the following mechanism for controlling the position of wheel $d$. The arbor $j$ carrying said wheel and pulleys $e$ is journaled in an arm $k$ pivoted to the frame and having the depending lug $l$. To this lug is pivotally attached the rear end of a lever $m$ which is fulcrumed between its ends on a vertically adjustable stud $n$ secured in the frame and from the forward end of which depends the link $o$, pivoted thereto. Link $o$ is shifted up or down to bring the wheel $d$ to any of the three positions mentioned as follows: In the frame is fulcrumed a treadle lever $p$ pivotally connected to the link as a lever of the second class, its fulcrum being the stud $q$; it is connected with the link between the ends thereof. In the frame is also fulcrumed the treadle lever $r$ pivotally connected with the link as a lever of the first class, its fulcrum being the stud $s$; it is connected with the lower end of the link. It will be obvious that when treadle $r'$ of lever $r$ is depressed the wheel $d$ will be shifted downwardly against belt $g$ so as to drive the reel forward, and that when the treadle $p'$ of lever $p$ is depressed the wheel $d$ will be shifted upwardly against wheel $c$ so as to drive the reel backward.

In the arrangement shown there is a condition of balance in the system of parts $d$ and $e$ and $j$ to $r'$ tending to preserve them in any position to which they may be moved. But it is preferable to provide means for returning the parts to the position shown in Fig. 1, that is, where $d$ is neutral to or out of contact with both $g$ and $e$, immediately downward pressure on treadle $r'$ is removed, the same consisting in the adaptation shown of an extensible elastic and flexible link $t$ connecting lever $r$ with the frame and opposing downward movement of said lever from the said position. The treadles $p'$ and $r'$ are arranged so that the former is slightly further inward than the latter and (in the neutral position of $d$, Fig. 1) slightly higher than the same, an arrangement found best suited for accomplishing in a convenient, quick and effective way the various movements of the system, and obviously allowing quick stopping and the reversing of the reel by changing the pressure from one to the other of the levers.

Having thus fully described my invention, what I claim and desire to secure by Letters Patent is:

A warping machine including, with the frame and the reel journaled therein and having a wheel forming a fixed part thereof, an endless belt loosely embracing the wheel, a driving wheel arranged between the belt and the first wheel and shiftable back and forth out of driving contact with one into driving contact with the other of them, and means for shifting the driving wheel back and forth including a pair of levers fulcrumed in the frame and each having a treadle at one end, and means, common to both levers, for transmitting shifting motion from the levers to said driving wheel, one of said levers being a lever of the second class and having the motion transmitting means connected therewith between its ends and the other lever being a lever of the first class and having said motion transmitting means connected therewith at its other end, substantially as described.

In testimony whereof I affix my signature in presence of two witnesses.

EUGENE P. SEARING.

Witnesses:
JOHN STEWARD,
WM. D. BELL.

Copies of this patent may be obtained for five cents each, by addressing the "Commissioner of Patents, Washington, D. C."